Oct. 16, 1934.  C. G. WOOD  1,977,368
CLUTCH PLATE
Filed Oct. 23, 1931  2 Sheets-Sheet 1

INVENTOR.
Clarence G. Wood
BY
Fay Oberlin & Fay
ATTORNEYS.

Oct. 16, 1934.   C. G. WOOD   1,977,368
CLUTCH PLATE
Filed Oct. 23, 1931   2 Sheets-Sheet 2
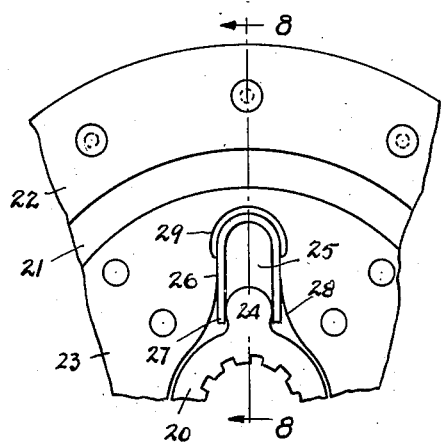
FIG. 4
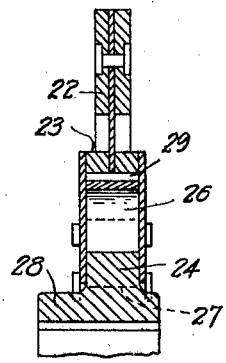
FIG. 8
FIG. 5
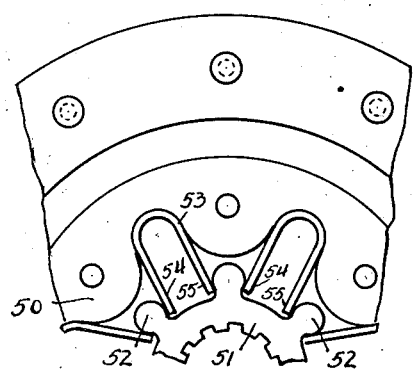
FIG. 7
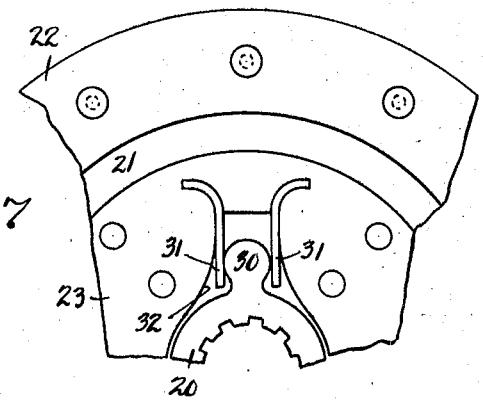
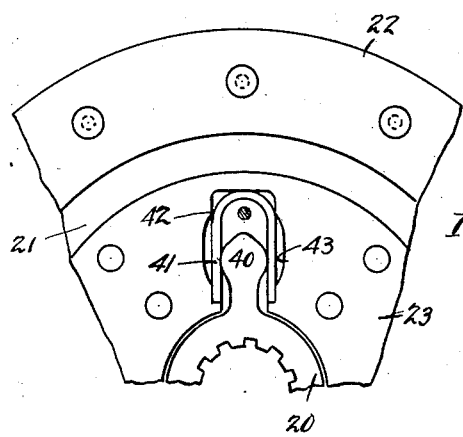
FIG. 6.
INVENTOR.
Clarence G. Wood.
BY
Fay, Oberlin & Fay
ATTORNEYS.

Patented Oct. 16, 1934

1,977,368

UNITED STATES PATENT OFFICE 1,977,368

CLUTCH PLATE

Clarence G. Wood, Cleveland Heights, Ohio

Application October 23, 1931, Serial No. 570,557

4 Claims. (Cl. 192—68)

The present invention, relating as indicated to clutches, is more particularly directed to a new and improved drive plate for use in a clutch of the general type employed in motor driven vehicles, for example, and a principal object of the invention is the provision of a simple and inexpensive means for absorbing minor variations in the torque transmitted through the drive plate and to provide lateral movement of the drive plate on the driven shaft or hub to accommodate for axial misalignment between these two members.

To the accomplishment of the foregoing and related ends, said invention, then, consists of the means hereinafter fully described and particularly pointed out in the claims; the annexed drawings and the following description setting forth in detail one product exemplifying my invention, such disclosed product constituting, however, but one of various applications of the principle of my invention.

Figure 1:
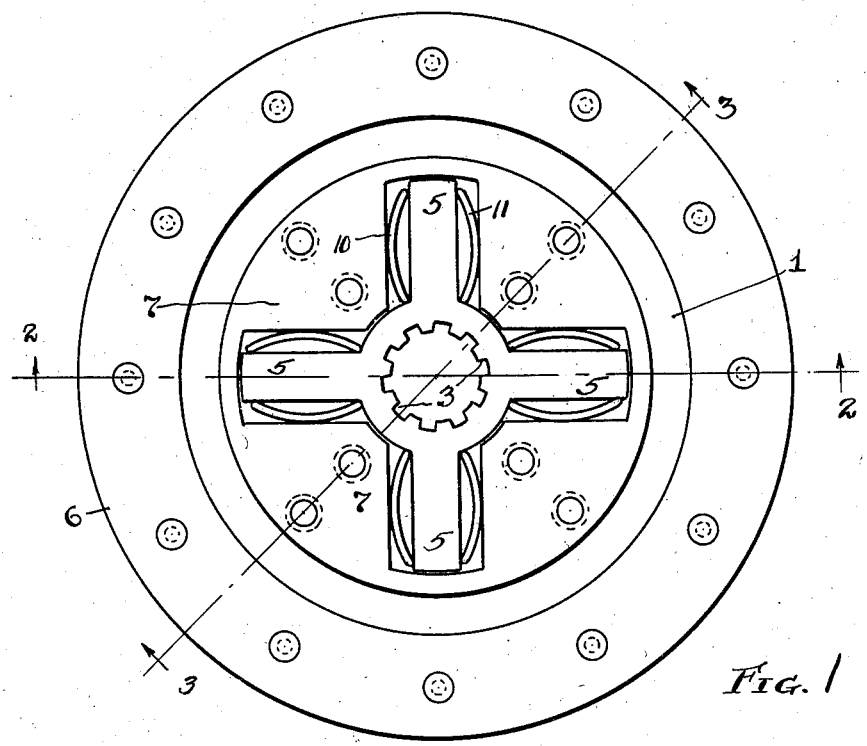
Figure 2:
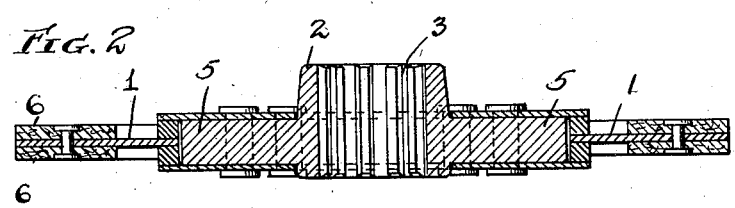
Figure 3:
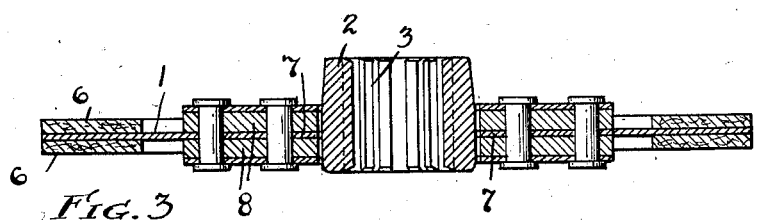

In said annexed drawings:

Fig. 1 is a front elevation of one form of my improved clutch; Figs. 2 and 3 are sections on the lines 2—2 and 3—3 in Fig. 1, respectively; Figs. 4, 5, 6 and 7 are partial front elevations showing modified forms of the construction shown in Fig. 1, and Fig. 8 is a section taken on line 8—8 of Fig. 4.

Referring now to Figs. 1, 2 and 3, my improved clutch plate is shown to consist of a driving member 1 and driven member 2, the driven member being here shown in the form of a hub provided with keyways 3 for engaging upon a suitably formed shaft and having a plurality of radially extending driven elements 5 equidistantly spaced around the hub. The driving member consists of the plate 1 provided with friction facing 6 on its radially outer portions and having a plurality of inwardly extending driving lugs 7 equidistantly spaced and extending into the spaces between the lugs 5 of the driven member.

The plate 1 is of relatively thin material and hence other plates 8 are secured on either side of the plate 1 to provide a thickness in the driving lugs 7 substantially equivalent to the thickness (axial) of the driven lugs 5. Interposed between the driven lugs 5 and the driving lugs 7 are curved springs 10 and 11 which are mounted in the space provided under some tension. These springs are of sufficient stiffness so that collectively they will transmit the rotational force from the driving lugs 7 irrespective of its direction of rotation to the driven lugs 5 by yielding lengthwise slightly, thus providing a torque absorbing connection between the driving and driven elements and permitting the driven element to be rotated at a substantially constant speed, irrespective of minor irregularities in the driving action. The construction illustrated provides an extremely simple means for securing a torque absorbing action between driving and driven elements in a clutch plate of the character described. It will of course be understood that the springs 10 and 11 may either be employed in the form of single-plate or multi-plate springs, and that any suitable means may be employed for maintaining the springs in position between the driving and driven lugs. A further advantage of this construction is that breakage of the springs will not put the clutch out of service, as a positive drive is also possible directly from the driving elements 7 to the driven elements 5.

Modifications of my improved clutch plate are shown in Figs. 4, 5 and 6, in each of which I have shown a driven element or hub 20 and a driving element 21 provided with friction facing 22, and with reinforcing and thickened plates 23.

In the construction shown in Fig. 4 the driven element is provided with a plurality of rounded driving keys or lugs 24, each of which is disposed in an opening 25 formed in the members 23 and is placed in driving connection therewith by means of a U-shaped spring 26. The spring 26 has its lower ends 27 engaged against the opposite sides of the driven lug 24 and the corresponding adjacent walls 28 of the plates 23 are relieved to permit of a certain amount of movement of the springs 26 in receiving and absorbing the driven force transmitted to the lugs 24. Similarly the upper portion of the opening 29, in which the spring 26 is received, is also relieved to permit a free movement of the spring 26. In the event of failure of the springs 26 a positive drive is of course effected between the driven lug 24 and the walls of the recess in which the spring is mounted in the members 23. In action the lower ends of the spring yield in either direction to absorb either irregularities or some part of the initial driving shock transmitted by the driving member in the manner already described for my improved type of clutch plate.

In Fig. 5 I have shown a second modification of this construction, in which the driven member 20 is provided with driving lugs 30 engaging against the lower ends of springs 31, which have curved upper ends removably mounted in suitably formed sockets in the members 23. The lower ends of the springs 31 yield under the driving action to absorb irregularities in the drive and are allowed a movement by the relief given the lower portions of the walls 32 in the openings in which the springs and driving member are mounted.

In Fig. 6 the driven element 20 is provided with driving lugs 40 of greater radial depth and of different form than those shown in Figs. 4 and 5, and engage against the intermediate portions 41 of U-shaped springs 42, which are mounted in suitable recesses 43 in the driving element 23. In this construction irregularities in the driving action are again absorbed by yield in the springs 42, the intermediate portions yielding if necessary until in contact with the walls 43 of the recesses.

It is desirable to assemble the various forms of clutch plates here shown with the resilient elements thereof initially under some slight tension as this effectively prevents backlash, which in many cases is produced by periodic irregularities in the driving force applied to the driving elements of the clutch. The tension may be secured in various ways in the various constructions. Thus in Fig. 1, initial tension may be secured by supplying the springs 10 of a greater curvature than that permitted when installed in the relationship shown in Fig. 1, that is, each of the springs in the center is flattened slightly to provide initial tension which may be proportioned to the conditions under which the clutch plate is to be operated.

In the form shown in Fig. 4 the U-shaped spring 26 may have its lower ends slightly convergent so that these arms must be spread slightly upon assembly over the lug 24. In the form shown in Fig. 5 the springs 31 may also converge slightly to give the same effect as just described for the construction of Fig. 4. In Fig. 6 the arms of the U-shaped springs there shown may initially be bowed inwardly slightly so that they must be spread for engagement with the lug 40.

It will be evident that the same initial tensioned engagement between the driving and driven elements can be secured by varying very slightly the spacing either between the sockets in the driving element or the projections in the driven elements, or by setting adjacent sockets at slight angles to their central radial line. These conditions have been found to be extremely effective in preventing the building up of periodic shocks in the mechanism producing periodic backlash and noise.

In Fig. 7 there is shown a driving element 50 and a driven hub element 51 provided with projecting lugs 52. Engaged in the driving element are U-shaped springs 53 provided with spaced arms 54 and 55, which may if desired be made in the form of separate springs instead of in the form of a single U-shaped spring, as shown. The lower ends of the arms 54 and 55 engage against opposite faces of the lugs 52 and serve to provide a resilient shock absorbing driving connection between the driving and driven members in either direction. A series of the springs 53 may be employed in the driving member so arranged and spaced that they engage the opposite sides of each of the lugs 52, as indicated in this figure.

In the various forms of my invention shown, I have provided a simple, inexpensive and readily assembled construction for transmitting a driving action from one element to another with a minimum of shock and irregularity of driving action.

It should also be noted from Figs. 2 and 3 that the reenforcing members and springs are disposed substantially co-extensive on either side of the clutch plate body or disc, thus insuring a satisfactory balance of weight of the parts and also eliminating too great a projecting portion on either side of the plate which might interfere with clutch levers or fly-wheel studs.

Other modes of applying the principle of my invention may be employed instead of the one explained, change being made as regards the product herein disclosed, provided the means stated by any of the following claims or the equivalent of such stated means be employed.

I therefore particularly point out and distinctly claim as my invention:—

1. In a clutch plate, the combination of a disc carrying friction facing rings, a hub member disposed centrally of said disc, a plurality of equidistantly spaced radially extending lugs mounted on said hub member, annular reinforcing members secured to said disc, recesses in said reinforcing members for the reception of said lugs, and radially arranged relatively flat spring elements mounted between the side walls of said recesses and said lugs, one end portion of said springs being fixed to said reenforcing members, the other end portion being free to flex upon relative movement of said hub member with respect to said disc.

2. In a clutch plate, the combination of a disc carrying friction facing rings, a hub member disposed centrally of said disc, a plurality of equidistantly spaced radially extending lugs mounted on said hub member, annular reinforcing members secured to said disc, recesses in said reinforcing members for the reception of said lugs, and U-shaped springs secured to said reinforcing members, the arms of said springs extending between the side walls of said recesses and said lugs, said arms being free to flex upon relative movement of said hub member with respect to said disc.

3. In a clutch plate, the combination of a disc carrying friction facing rings, a hub member disposed centrally of said disc, a plurality of equidistantly spaced radially extending lugs mounted on said hub member, annular reinforcing members secured to said disc and extending equidistantly on either side thereof, recesses in said reenforcing members for the reception of said lugs; and radially arranged relatively flat spring elements having their widths substantially co-extensive to said reinforcing members and mounted between the side walls of said recesses and said lugs.

4. In a clutch plate, the combination of a disc carrying friction facing rings, a hub member disposed centrally of said disc, a plurality of equidistantly spaced radially extending lugs mounted on said hub member, annular reinforcing members secured to said disc and extending equidistantly on either side thereof, recesses in said reinforcing members for the reception of said lugs, and U-shaped springs secured to said reinforcing members, the arms of said springs extending between the side walls of said recesses and said lugs, said springs having their widths substantially co-extensive with said reinforcing members.

CLARENCE G. WOOD.